(12) United States Patent
Graefe et al.

(10) Patent No.: US 9,009,428 B2
(45) Date of Patent: Apr. 14, 2015

(54) DATA STORE PAGE RECOVERY

(75) Inventors: Goetz Graefe, Madison, WI (US);
Harumi Kuno, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 771 days.

(21) Appl. No.: 13/179,261

(22) Filed: Jul. 8, 2011

(65) Prior Publication Data
US 2013/0013874 A1 Jan. 10, 2013

(51) Int. Cl.
*G06F 12/00* (2006.01)
*G06F 11/14* (2006.01)

(52) U.S. Cl.
CPC ........ *G06F 11/1469* (2013.01); *G06F 11/1471* (2013.01)

(58) Field of Classification Search
CPC ............................ G06F 3/067; G06F 11/1456
USPC .................................................. 711/161, 162
See application file for complete search history.

(56) References Cited

U.S. PATENT DOCUMENTS

| 5,764,877 | A | 6/1998 | Lomet et al. |
|---|---|---|---|
| 6,591,269 | B1 | 7/2003 | Ponnekanti |
| 2004/0143562 | A1 | 7/2004 | Chen et al. |
| 2005/0120059 | A1 | 6/2005 | Verma et al. |
| 2005/0197017 | A1* | 9/2005 | Chou et al. ..................... 439/660 |
| 2006/0224636 | A1* | 10/2006 | Kathuria et al. .............. 707/200 |
| 2006/0230079 | A1* | 10/2006 | Strahl et al. ................... 707/203 |
| 2009/0300276 | A1* | 12/2009 | Torabi ........................... 711/103 |
| 2010/0199042 | A1 | 8/2010 | Bates et al. |

OTHER PUBLICATIONS

Data Recovery & Repair: A Practical Handbook, pp. 1-39, White Sands Technology, Inc. [online], May 5, 2008 [retrieved on Jul. 8, 2011] Retrieved from the Internet: <URL: http://www.whitesands.com/Products/dri_white.pdf>.
Graefe and Kuno 2012: Goetz Graefe, Harumi A. Kuno: Definition, detection, and recovery of single-page failures, a fourth class of database failures. PVLDB 5(7): 646-655 (2012).
Levy 1991: Eliezer Levy: Incremental restart. ICDE 1991: 640-648.
Levy and Silberschatz 1992: Eliezer Levy, Abraham Silberschatz: Incremental recovery in main memory database systems. IEEE TKDE 4(6): 529-540 (1992).
Speer and Kirchberg 2007: Jayson Speer, Markus Kirchberg: C-ARIES: A multi-threaded version of the ARIES recovery algorithm. DEXA 2007: 319-328.

* cited by examiner

*Primary Examiner* — Gurtej Bansal
(74) *Attorney, Agent, or Firm* — Hewlett-Packard Patent Department; Benjamin Mitchell Searle

(57) ABSTRACT

In one implementation, a data store page recovery process includes selecting a page reference and an update record reference at a page recovery mapping based on a page identifier, accessing a backup page via the page reference, accessing an update record via the update record reference, and modifying the backup page according to the update record. The page reference is associated with the update record reference at the page recovery mapping.

16 Claims, 8 Drawing Sheets

DATA STORE PAGE RECOVERY

BACKGROUND

Data stored at data stores become corrupt or inaccessible when the memories at which the data stores store data become corrupt or cease to function properly. As a specific example, a data store page can have errors such as incorrect, inaccessible, or corrupt data values if the memory or storage media at which that page is stored ceases to properly store data. Data stores are often recovered from such system or storage media failures using snapshots or backups of the data stores (e.g., copies of the data stored at the data stores). Additionally, many data stores include a recovery log that records transactions (e.g., what data was altered) within the data store and aids in recovery or rollback of transactions after such failures.

For example, an update record can be stored at the recovery log when data at a page of the data store is to be altered or updated. After detecting a failure such as a storage media failure at a data store, a recovery mechanism searches the snapshots of the data store to locate a copy of the data (or contents) of the data store that does not include errors resulting from the failure. After such a snapshot is located, the data from the snapshot can be copied to a functioning memory (or memory locations of a memory). Update records from the recovery log are then applied to the copy of the snapshot to update that data at the snapshot to the most recent state of the data store that does not include errors from the failure.

Identifying a copy of the data store that does not include errors resulting from the failure, replicating that copy of the data store, and applying update records to that copy of the data store can be a time- and resource-intensive process. For example, the data store is often taken offline (e.g., made unavailable or not responsive to client requests) during recovery of the data store due to the time and computing resources required to identify a copy of the data store that does not include errors resulting from the failure.

DETAILED DESCRIPTION

Figure 1:
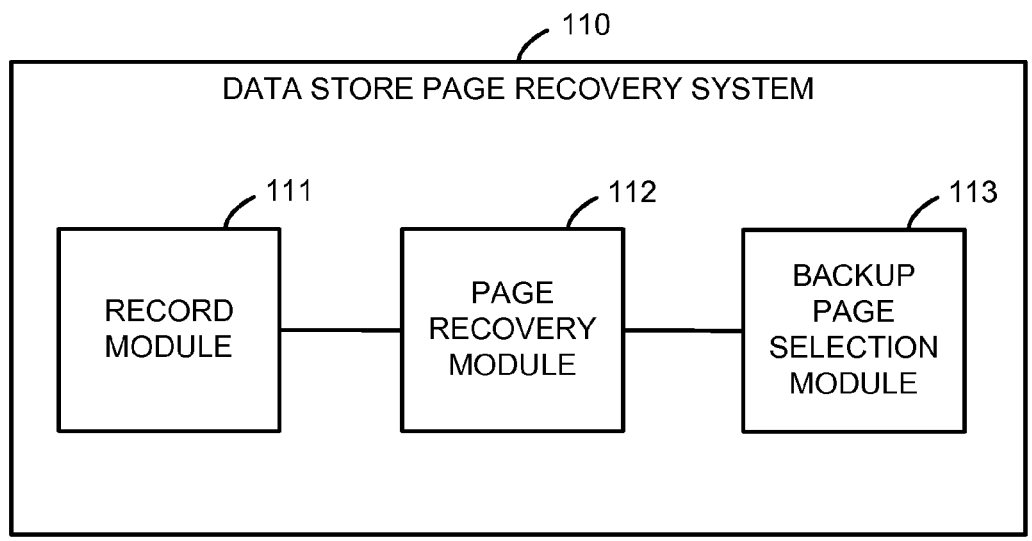
FIG. 1 is a schematic block diagram of a data store page recovery system, according to an implementation.

Implementations discussed herein can provide page-level (or per page) recovery of data stores while the data stores are online and without searching for backup pages or snapshots of the data store and without requiring the recovery of the entire data store. More specifically, data store page recovery systems or processes discussed herein include a page recovery mapping that provides direct references to a backup page and to one or more update records for each page of a group of pages of a data store. Thus, backup pages of the data store and corresponding update records can be directly accessed to update any given page from the group of pages, which provides enhanced speed (e.g., snapshots are not searched to locate or identify a backup page) and efficiency (e.g., only the failed page or failed pages rather than the complete contents of a data store are recovered).

As used herein, the singular forms "a," "an," and "the" include plural referents unless the context clearly dictates otherwise. Thus, for example, the term "page" is intended to mean one or more pages or a combination of pages. Additionally, as used herein, the term "module" refers to a combination of hardware (e.g., a processor such as an integrated circuit or other circuitry) and software (e.g., machine- or processor-executable instructions, commands, or code such as firmware, programming, or object code). A combination of hardware and software includes hardware only (i.e., a hardware element with no software elements), software hosted at hardware (e.g., software that is stored at a memory and executed or interpreted or at a processor), or at hardware and software hosted at hardware.

Data stores store data (or information) at memories and typically provide one or more interfaces via which clients of the data stores (e.g., users, computing devices, or software applications hosted at computing devices) can access (e.g., read, write, or alter) those data. A memory is a non-transitory processor-readable medium at which data can be accessed. That is, a processor can store data at a memory and access those data at a later time. Some memories are volatile or non-persistent such as volatile random access memories ("RAMs"). Other memories are non-volatile or persistent such as hard disk drives ("HDDs"), solid-state drives ("SSDs"), digital versatile discs ("DVDs"), compact discs ("CDs"), tape archives, FLASH drives, memristor devices, phase-change memory devices. Non-volatile memories can be referred to as storage devices, and can include volatile memories as buffers or caches.

Typically, the interfaces via which data stores expose data to clients define formats that differ from the format in which the data is physically stored at the memories. In other words, data stores can be logical or can define a logical abstraction from the storage format of the memories at which data stores store data. For example, a data store can be a partition or logical volume of a storage device, a filesystem, a database, or an index such as a web-page index. Although each of these data stores can store data in a common format at a memory, each of these data stores provides a different interface (or interfaces) via which a client can access data stored by that data store.

Data stores typically manage data stored at those data stores as pages. A page is a group of data (e.g., a number of bits, bytes, or words) that are managed as an indivisible block by a data store. For example, a data store can have pages that are 4-kilobytes in size. In this example, the data store reads and writes (or accesses or manages) data in groups of 4-kilobytes (or pages).

FIG. 1 is a schematic block diagram of a data store page recovery system, according to an implementation. Data store page recovery system 110 includes record module 111, page recovery module 112, and backup page selection module 113. Although these modules are illustrated and discussed herein as separate components or elements of data store page recovery system 110, two or more of these modules can be aggregated or combined into a common module. In other words, the modules—or functionalities thereof—of data store page recovery system 110 can be implemented or realized in configurations other than those illustrated in FIG. 1.

Record module 111 stores update records at a recovery log. For example, record module 111 can store an update record at a recovery log recording that a page has been written to disk (e.g., to a persistent data storage medium or device) when a page buffer of the page associated with the update record is written to disk. Update records describe updates, changes, or alterations between the most recent authoritative version of the page stored at the page buffer and a prior version of the page.

Additionally, record module 111 updates an update record reference (e.g., a reference to an update record) of the update record to point or refer to a previous update record. Said differently, record module 111 stores a reference to another (e.g., the previous) update record at the update record that record module 111 stores at the recovery log. A reference is a value that indicates, for example, a location, address, or resource at which an entity such as an update record or a page can be accessed. For example, a reference such as a page reference or update record reference can be a memory pointer or address, a block identifier, a network path, a device path, a record identifier, a uniform resource identifier ("URI"), or some other indicator.

Thus, the most recent (or most recently added or current) update record describes how to access the previous update record. Accordingly, the previous update record can be accessed via the update record reference at the current update record. In other words, record module 111 can define a linked list of update records stored at the recovery log. In some implementations, the previous update record to and the current update record each are associated with or related to a common page. Accordingly, the recovery log can include multiple linked lists of update records, each associated with a different page or a different group of pages.

In some implementations, record module 111 also provides a signal or notification to page recovery module 112 to indicate that a new update record has been stored at the recovery log. This notification can include, for example, an identifier of the page (e.g., a page identifier) associated with the new update record and a reference to the new update record. Page recovery module 112 stores the reference to the new update record at a portion of a page recovery mapping of page recovery system 110. For example, page recovery module 112 can access a portion of a page recovery mapping based on a page identifier, and replace a reference to a previous update record with a reference to a current update record. In other words, page recovery module 112 updates the page recovery mapping to refer to the most recent update record for a page.

Backup page selection module 113 selects a backup page for each of a group of pages of a data store, and provides a reference to each backup page to page recovery module 112. A backup page can be located at one or more of a variety of physical (e.g., memories such as RAMs, magnetic or solid-state disk drives, or storage arrays) and logical locations (e.g., volumes or partitions). For example, backup page selection module 113 can select a page from a snapshot of a data store from traditional media backup such as a tape archive as a backup page for that page. Alternatively, the backup page could be located in a recovery log if a page was newly allocated and formatted, or in a database if the page was recently moved (e.g., during a defragmentation process). Typically, a backup page for a recently moved and de-allocated page is protected against reuse for another purpose, at least as long as that page is a page backup to allow single-page recovery (i.e., recovery of the page for which the backup page serves as a backup).

A backup page is an instance of a page of a data store that is used as a starting point for recovery of that page. In other words, a backup page is an instance of a page for which the backup page serves as a backup. For example, the backup page can be a version of a page. The page—or the contents or data thereof—may be subsequently updated (changed, modified, or altered), but the backup page remains static (e.g., unchanged). Said differently, data at the backup page represents a stable view or snapshot of the state of the page to which update records can be applied to bring the page up-to-date.

Similar to record module 111, in some implementations, backup page selection module 113 provides a notification that a backup page has been selected for a page to page recovery module 112. The notification can include, for example, a page identifier of the page for which the backup page serves as a backup and a reference to the backup page (or a page reference). Page recovery module 112 accesses the portion of the page recovery mapping related to the page for which the backup page serves as a backup using the page identifier, and stores the page reference at the page recovery mapping. Accordingly, the page recovery mapping can include a reference to a backup page and a reference to an update record for each page represented in the page recovery mapping.

When a failure is detected at a page of (i.e., a failed page is detected at) a data store associated with page recovery system 110, page recovery module 112 accesses the reference to the backup page and the reference to the update record or records for that page at the page recovery mapping. For example, page recovery module 112 can receive the page identifier of the failed page with a notification of the failure, and can access the reference to the backup page and the reference to the update record for that page using the page identifier. Page recovery module 112 then directly accesses the backup page and the update record via or using the reference to the backup page and the reference to the update record, respectively. In other words, page recovery module 112 requests the backup page and the update record via or using the reference to the backup page and the reference to the update record rather than searching a recovery log or group of snapshots of the data store.

Page recovery module 112 can then modify the backup page according to the update record and previous update records (e.g., using the changes described in the update record and previous update records) to which the update record refers. Thus, the backup page can be modified or updated to include the most recent data of the page before the page failed. In other words, the data store then uses the modified backup page as a starting point for reconstructing the failed page. It should be understood that the term "backup page" as used herein refers to the backup page itself and to copies of the backup page. Thus, page recovery module 112 can copy the data from the backup page to a functioning portion of a memory, and then modify the copy of the backup page according to the update record and previous update records. Because the backup page and update record (or update records) can be accessed directly using the reference to the backup page and the reference to the update record, respectively, the data store need not be taken offline to recover from the failure. Rather, the data store can remain online, and requests for access to the failed page can be queued for processing or handling after the failed page is recovered. Because the data store is online, requests for access to other pages of the data store can be processed or handled during recovery of the failed page. Requests for access to the failed page can be queued for processing or handling after recovery of the failed page.

Figure 2:
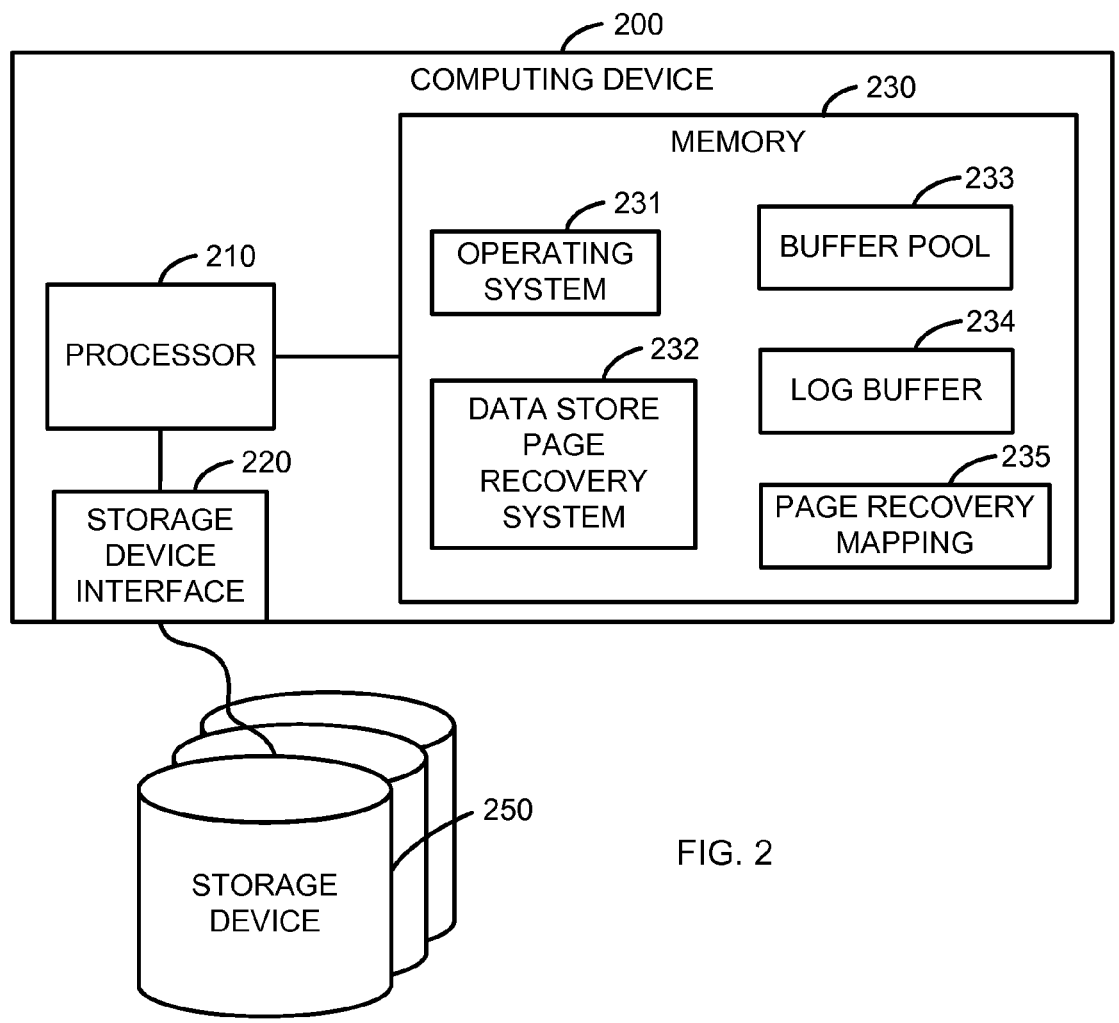
FIG. 2 is a schematic block diagram of an environment in which a data store page recovery system is hosted, according to an implementation.

FIG. 2 is a schematic block diagram of an environment in which a data store page recovery system is hosted, according to an implementation. Computing device 200 includes processor 210, storage device interface 220, and memory 330. Processor 210 is any combination of hardware and software that executes or interprets instructions, codes, or signals. For example, processor 210 can be a microprocessor, an application-specific integrated circuit ("ASIC"), a distributed processor such as a cluster or network of processors or computing device, or a virtual machine.

Storage device interface 220 is a module in communication with processor 210 via which computing device 200 communicates (e.g., exchange symbols or signals representing data or information) with storage devices (e.g., one or more storage devices) 250. Storage device interface 220 can include hardware (e.g., pins, connectors, or integrated circuits) and software (e.g., drivers or communications stacks). For example, storage device interface 220 can be a Parallel AT Attachment ("PATA") interface, a Serial AT Attachment ("SATA") interface, a Small Computer Systems Interface ("SCSI") interface, a network (e.g., Ethernet, Fiber Channel, InfiniBand, Internet Small Computer Systems Interface ("iSCSI"), Storage Area Network ("SAN"), or Network File System ("NFS")) interface, a Universal Serial Bus ("USB") interface, or another storage device interface. Storage device interface 220 can also include other forms of memory, including non-volatile random-access-memory (NVRAM), battery-backed random-access memory (RAM), phase change memory, etc.

Memory 230 is a processor-readable medium that stores instructions, codes, data, or other information. For example, memory 230 can be a volatile random access memory ("RAM"), a persistent or non-transitory data store such as a hard disk drive or a solid-state drive, or a combination thereof or other memories. Furthermore, memory 230 can be integrated with processor 210, separate from processor 210, or external to computing device 200.

As illustrated in FIG. 2, memory 230 includes operating system 231, data store page recovery system 232, buffer pool 233, log buffer 234, and page recovery mapping 235. Operating system 231 data store page recovery system 232 are each instructions or code that when executed at processor 210, cause processor 210 to perform operations that implement, respectively, operating system 231 and data store page recovery system 232. Said differently, operating system 231 and data store page recovery system 232 are hosted at computing device 200.

More specifically, data store page recovery system 232 includes code or instructions that implement modules such as record module 111, page recovery module 112, and backup page selection module 113 discussed above in relation to FIG. 1. Additionally, data store page recovery system 232 includes code or instructions that implement processes such as processes 300, 600, and 900 discussed in relation to FIGS. 3, 6, and 9, respectively.

In some implementations, a data store page recovery system can be hosted or implemented at a computing device appliance (or appliance). That is, the data store page recovery system can be implemented at a computing device that is dedicated to hosting the data store page recovery system. For example, the data store page recovery system can be hosted at a computing device with a minimal or "just-enough" operating system to support the data store page recovery system. Furthermore, the data store page recovery system can be the only, exclusive, or primary software application hosted at the appliance.

In some implementations, buffer pool 233 includes page buffers for pages of a data store. Pages with page buffers in buffer pool 233 can be referred to as buffered in or at buffer pool 233. In other words, buffer pool 233 is a cache for pages of a data store. Accordingly, in some implementations, the data at page buffers in buffer pool 233 are the authoritative data for pages of the data store buffered at buffer pool 233. Thus, changes to the data in page buffers at buffer pool 233 are pushed to corresponding pages at storage devices 250. More specifically, a data store or data store page recovery system 232 generates update records that describe the changes to the data in page buffers in buffer pool 233.

Log buffer 234 stores update records for the pages buffered in buffer pool 233. That is, the update records in log buffer 234 describe changes to the page buffers in buffer pool 233. As a specific example, update records for the page buffered in buffer pool 233 can be temporarily stored at log buffer 234 while they are defined, and then moved to or stored at a recovery log at a persistent storage device such as storage device 250. In some implementations, log buffer 234 is not included at memory 230, and update records are written directly to a persistent recovery log (e.g., a recovery log at storage device 250). Moreover, in some implementations, pages are not buffered at buffer pool 233. Rather, pages are directly written to and read from a persistent storage medium such as storage device 250.

When a change is made to a page buffer in buffer pool 233, the change is written to an update record at log buffer 234, and page recovery mapping 235 is updated to memorialize or record that the update record applies to the page associated with that page buffer. In some implementations, that update record is then written or persisted to a persistent recovery log (e.g., at storage device 250). Moreover, in some implementations the page buffer is also written to storage device 250 (e.g., when that page buffer is evicted from buffer pool 233). In other words, buffer pool 233 (or the page buffers at buffer pool 233) and/or log buffer 234 (or the update records at log buffer 234) can be persisted at a persistent storage medium or device different from memory 230 such as storage device 250.

In some implementations, a page buffer from buffer pool 233 written to a persistent storage device can be used by data store page recovery system 232 as a backup page. Moreover, for a page buffer that has been written successfully to a persistent storage medium and evicted from the buffer pool, updating the page recovery mapping to refer to that the page at the persistent storage medium including the contents or data of this page buffer as a backup page may be considered equivalent to logging that the buffer page was successfully written to the persistent storage medium (e.g., a database). That is, updating the page recovery mapping can take the place of explicitly logging successful write operations.

When changes to the page buffers in buffer pool 233 are written to an update record at log buffer 234, data store page recovery system 232 stores that update record in a recovery log. Data store page recovery system 232 also stores a reference to that update record at page recovery mapping 235. As a result, page recovery system 232 can directly access (or locate) that update record.

In one example implementation, a page recovery mapping 235 is a table, index, database, or other repository of information related to pages that is used to recover failed pages. For example, page recovery mapping can be a table at which each row is associated with a page, and the columns of each row include information such as an identifier of the page for that row, a reference to a backup page for that row, and a reference to an update record for that page. Thus, the data in the columns of each row of page recovery mapping 235 are related or associated one with another. In other implementations, page recovery mapping 235 can be or include more complex data structures such as trees, hashes, or lists at which data related to a common page are associated with one another. As a specific example, page recovery mapping 235 is an index structure such as a B-tree.

In yet another example implementation, data store page recovery system 232 does not access page recovery mapping 235, rather, each update record includes a reference to the previous (or next-most-recent) update record pertaining the page for which that update record describes a change. Similarly, in some implementations, pages, including backup pages, include an identifier of or reference to the most recent update record associated with that page's data. For example, when a change is made to a page in a buffer pool and an update record reflecting or recording that change is created and written to an update log and/or recovery log, a sequence number for that update record can be added to the page in the buffer pool and/or at a persistent storage medium. Should that page then be immediately evicted from the buffer pool and written to a persistent storage medium, this sequence number would be part of the persisted page's contents (e.g., metadata of that page).

Figure 3:
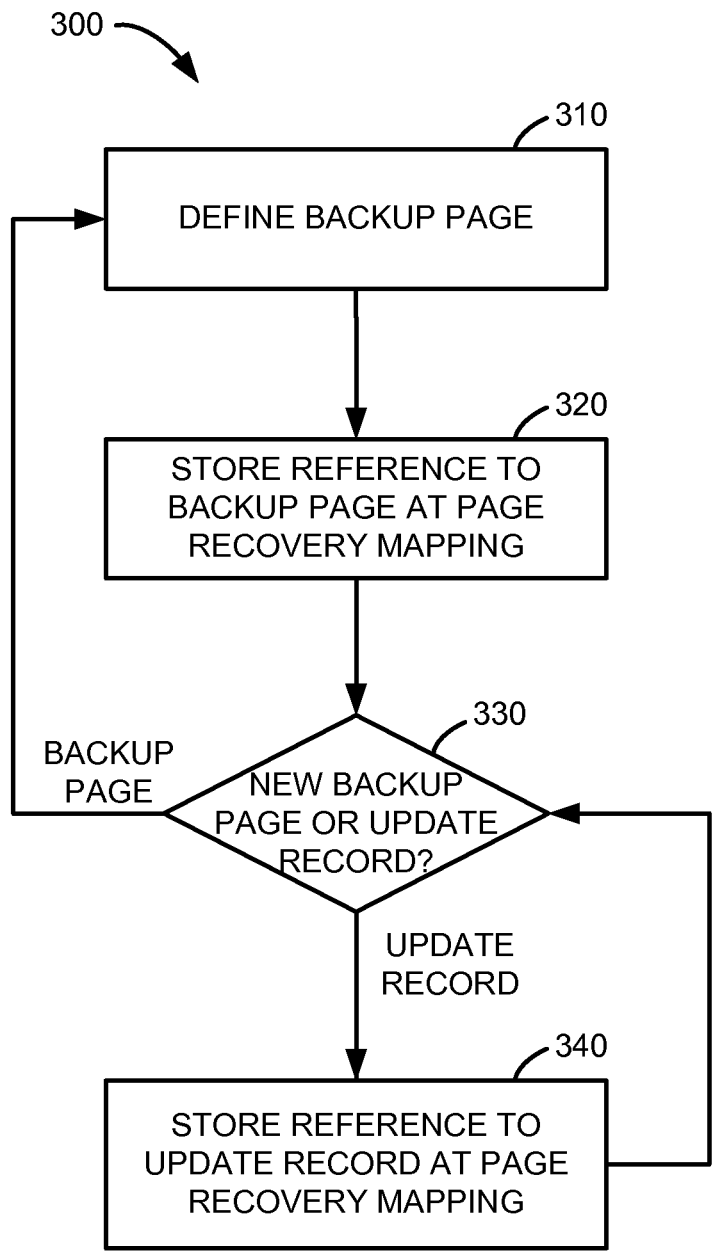
FIG. 3 is a flowchart of a data store page recovery process, according to an implementation.

FIG. 3 is a flowchart of a data store page recovery process, according to an implementation. Process 300 can be executed at a data store page recovery system to, for example, populate, initialize, or maintain a page recovery mapping. A backup page is defined at block 310. For example, a backup page can be defined from a valid page (e.g., a page that is not corrupted or has not failed) by copying the data stored at the valid page to a new page. As a more specific example, a backup page can be a copy of a page selected from a snapshot of a data store. Alternatively, the backup page can be defined as the valid page. For example, the backup page can be a page selected from a snapshot of a data store rather than a copy of that page.

In some implementations, the backup page is marked to prevent deletion of the backup page. For example, a delete bit in an attributes bit field (or bit map) of the backup page can be set to a value that indicates the backup page is in use or should not be deleted or subjected to garbage collection. Furthermore, the backup page can be marked to prevent movement of the data at the backup page. For example, the delete bit can be interpreted by an operating system or device driver to mean that the data at the page should be moved back to the page during a wear-leveling process for a memory.

A reference to the backup page (or a page reference associated with the backup page) is stored at a page recovery mapping at block 320. For example, a reference to the backup page can be stored at a portion of a page recovery mapping that is associated with or related to the page for which the backup page serves as a backup.

Process 300 waits at block 330 for a new backup page or update record. If a new backup page should be defined, process 300 returns to block 310. For example, a new backup page can be defined if a backup page fails, becomes corrupted, or is deleted, or if a storage device at which the backup page is located becomes inaccessible to a data store page recovery system implementing process 300. Additionally, a new backup page can be defined to update a backup page to a new or updated version of the page for which the backup page serves as a backup. Furthermore, process 300 can return to block 310 to define a backup page for the next page in a group of pages of a data store.

If an update record is received or generated at block 330, a reference to that update record is stored at a portion of the page recovery mapping associated with the page for which the update record describes one or more changes at block 340.

In other words, the update record reference is stored at the page recovery mapping such that the update record is associated with the page to which the update record relates. For example, the update record can include a page identifier, and the data store page recovery system implementing process 300 can store the update record at the page recovery mapping based on the page identifier. Process 300 then returns to block 330.

FIG. 3 illustrates a particular example of process 300. Accordingly, in other implementations, process 300 can include additional or fewer blocks, or blocks assembled in a different order than those illustrated in FIG. 3. For example, a data store page recovery system implementing process 300 can store a reference to a previous update record at the update record to which the reference is stored at the page recovery mapping at block 340 to define a linked list of update records.

Figure 4:
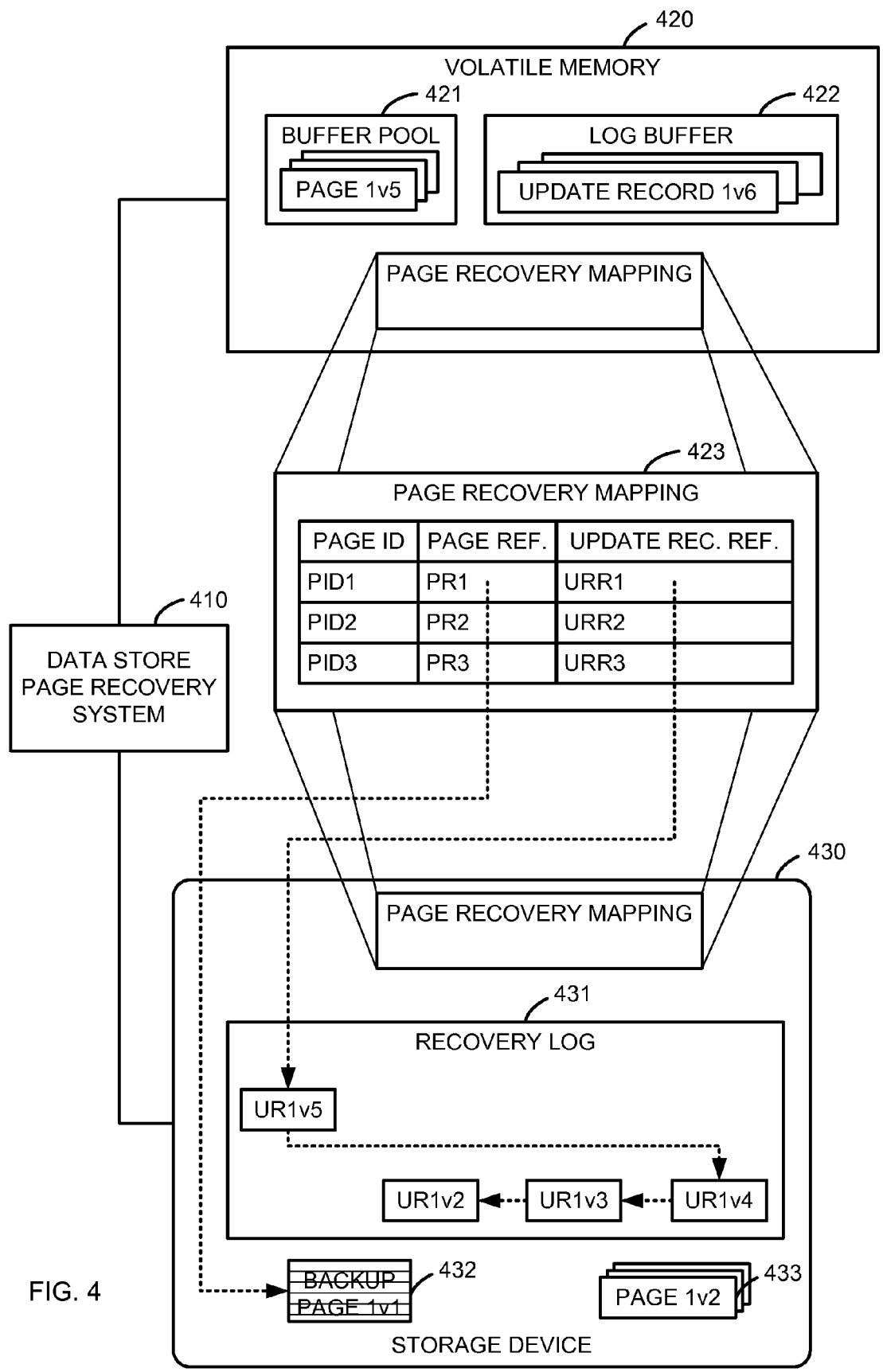
FIGS. 4 and 5 illustrate operation of a data store page recovery system within an environment, according to an implementation.
Figure 5:
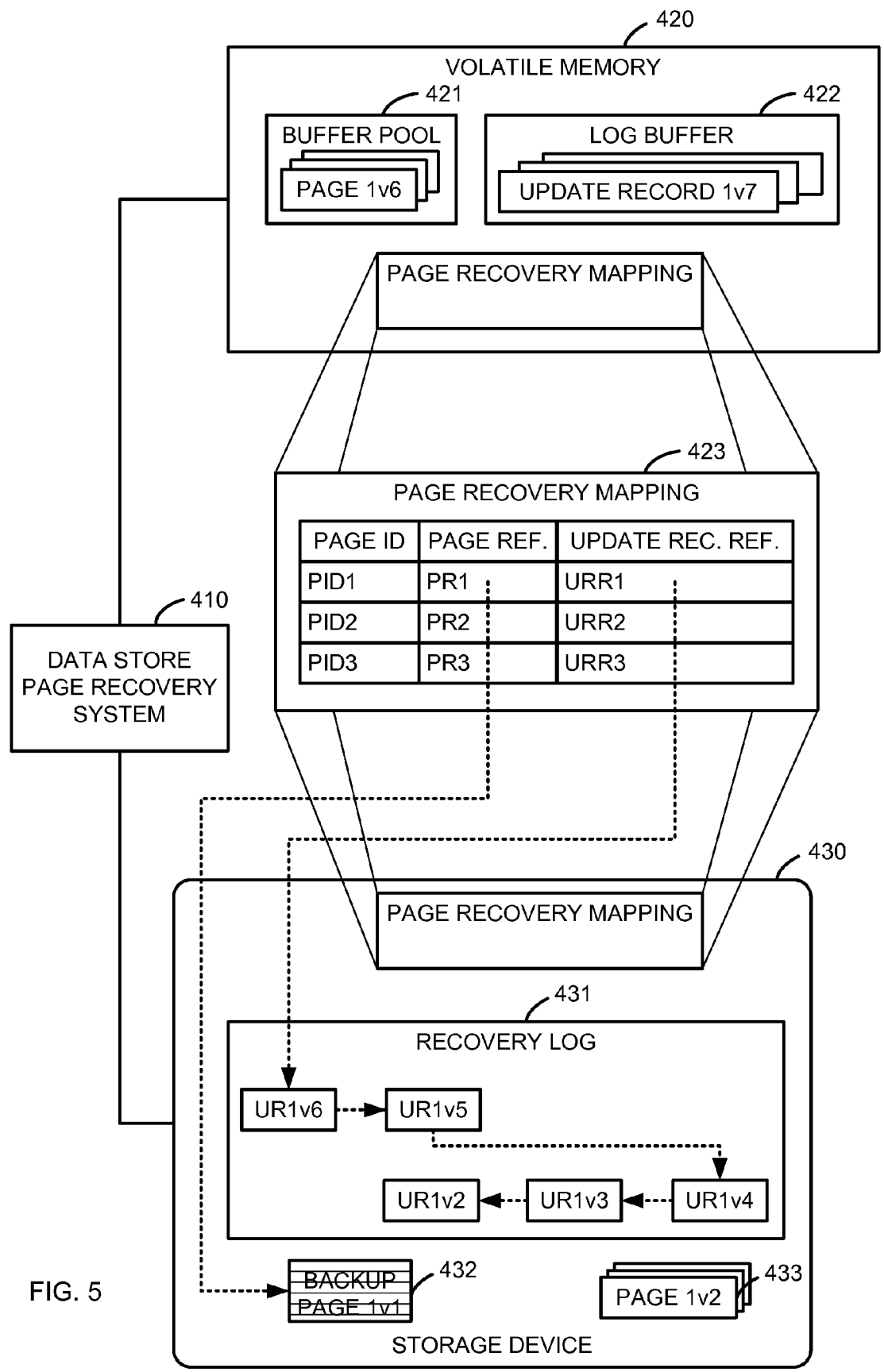

FIGS. 4 and 5 illustrate operation of a data store page recovery system within an environment, according to an implementation. More specifically, FIGS. 4 and 5 illustrate maintenance of (e.g., an update to) a page recovery mapping. The environment illustrated in FIGS. 4 and 5 includes data store recovery system 410, volatile memory 420, and storage device 430. A data store includes pages 433, recovery log 431, buffer pool 421, and log buffer 422. Data store page recovery system 410 accesses page recovery mapping 423 to store references to backup pages and references to update records of the data store. More specifically, in this example, page recovery mapping 423 is organized as a table in which each row includes a page identifier (labeled "PAGE ID"), a reference to a backup page or page reference (labeled "PAGE REF."), and a reference to an update record or update record reference (labeled "UPDATE REC. REF.").

FIGS. 4 and 5 illustrate interaction between a data store (e.g., including recovery log 431, buffer pool 421, and log buffer 422), page recovery mapping 423, and data store page recovery system 410 with respect to a single page of a data store. This page is referred to herein as page 1. It should be understood that a data store can include multiple pages, and data store page recovery system 410 can manage page recovery mapping 423 for additional pages.

Various update records of updates related to changes made to page 1 are illustrated in FIGS. 4 and 5. For example, a fifth version of page 1 (labeled "PAGE 1*v*5") is included at buffer pool 421 (e.g. a page buffer for page 1 that includes data from PAGE 1*v*2 (a second version of page 1) with changes described in update records UR1*v*3, UR1*v*4, and UR1*v*5 applied), backup page 432 (labeled "BACKUP PAGE 1*v*1") is an earlier version of page and is marked to indicate that it should not be deleted, and one of pages 433 (labeled "PAGE 1*v*2") is a second version of page 1. Additionally, various update records that describe changes to the data of page 1 are illustrated at FIGS. 4 and 5. For example, the update record labeled UR1*v*2 includes a description of changes to the first version of page 1 that resulted in or produced the second version of page 1, the update record labeled UR1*v*2 includes a description of changes to the second version of page 1 that resulted in or produced the third version of page 1, the update record labeled UR1*v*4 includes a description of changes to the third version of page 1 that resulted in or produced the fourth version of page 1, and the update record labeled UR1*v*5 includes a description of changes to the fourth version of page 1 that resulted in or produced the fifth version of page 1.

In some implementations and as illustrated in FIGS. 4 and 5, update records UR1*v*2, UR1*v*2, UR1*v*4, and UR1*v*5 define a linked list. That is, each update record includes a reference (or refers to) another update record. Thus, for example, update record UR1v2 can be accessed from update record UR1v5 by following or dereferencing the reference at UR1v5 to UR1v4, from UR1v4 to UR1v2, and from UR1v2 to UR1v2. Update record 1v6 includes a description of changes to the fifth version of page 1 that will result in or produce a sixth version of page 1 when those changes are complete.

Page recovery mapping 423 defines a map or index between pages of the data store and information that can be used to recover those pages after or in response to failure of one or more of those pages. As illustrated at FIG. 4, page recovery mapping 423 is stored at volatile memory 420 and storage device 430. For example, volatile memory 420 can be a cache for page recovery mapping 423 that is persistently stored at storage device 430. In other implementations, page recovery mapping 423 can be stored exclusively at volatile memory 420 or exclusively stored at storage device 430.

In the example illustrated in FIGS. 4 and 5, page 1 has a page identifier PID1. A page identifier is a value that identifies a page within the data store. For example, a page identifier can be a value that is unique to a page within the data store. Data store page recovery system 410 uses the page identifier of a page to access the information at page recovery mapping 423 that can be used to recover that page after or in response to failure of that page. That is, data store page recovery system 410 can locate or access a portion of page recovery mapping 423 that is associated with or related to a particular page based on or using the page identifier of that page.

In the example illustrated in FIGS. 4 and 5, page recovery mapping 423 includes a page reference associated with a backup page and an update record reference for pages in the data store. With reference to page 1, page recovery mapping 423 includes page reference PR1 that refers to, identifies, or points to backup page 432. Additionally, page recovery mapping 423 includes update record reference URR1 that refers to, identifies, or points to update record UR1v5.

Referring specifically to FIG. 4, as discussed above, the version of page 1 in buffer pool 421—here, the fifth version, version 5, or v5—is the authoritative version of page 1. That is, the data store reads data from and writes data to the page buffer for page 1 in buffer pool 421. Page 1v2 of pages 433 is the third version of page 1, and is the most recent version of page 1 at storage device 430. In some implementations, page 1v2 of pages 433 is referred to as the active page for page 1. That is, page 1v2 of pages 433 is the version of the page stored at a persistent memory of the data store. Because backup page 432 is a copy of the first version of page 1, backup page 432 must be modified or updated to the second version of page 1 to recover from a failure of page 1v2 of pages 433. Although page 1v2 of pages 433 (e.g., the active page for page 1 in the data store) is illustrated in FIGS. 4 and 5 as the second version of page 1, at another time or in another example, page 1v2 of pages 433 can be another version of page 1 such as the third version or fifth version. If backup page 432 is an earlier version of page 1 than page 1v2 of pages 433, backup page 432 can be updated to the same version of page 1 as page 1v2 of pages 433 or to a later version of page 1 to recover from a failure at page 1v2 of pages 433. Similarly, backup page 432 can be modified or updated to the fifth version of page 1 to recover from a failure of page 1v5 at volatile memory 420. Recovery of a failed page is discussed in more detail herein in relation to, for example, FIGS. 6, 7, and 9.

FIG. 4 illustrates the environment before page 1v5 is written from buffer pool 421 to storage device 430, and FIG. 5 illustrates the environment after page 1v5 is written from buffer pool 421 to storage device 430. When page 1v5 is written from buffer pool 421 to storage device 430, the changes described in update record 1v6 are applied to page 1v5 to define page 1v6 (i.e., a sixth version of page 1) at buffer pool 421 as illustrated at FIG. 5. Page 1v6 is then the authoritative version of page 1. That is, page 1v6 is the most up-to-date version of the page at the data store. Additionally, update record 1v6 is stored at recovery log 431, as illustrated in FIG. 5.

Data store page recovery system 410 is notified or detects that page 1v5 has been written from buffer pool 421 to storage device 430, and updates page recovery mapping 423 to include the most recent or up-to-date information from which page 1 can be recovered. More specifically, a record module, for example, of data store page recovery system 410 stores update record 1v6 at recovery log 431 as update record UR1v6, and stores a reference to update record UR1v5 at update record UR1v6. Additionally, a page recovery module, for example, of data store page recovery system 410 accesses the portion of page recovery mapping 423 associated with page 1 using the page identifier of page 1, and stores a reference to update record UR1v6 as update record reference URR1. Thus, update record reference URR1 refers to update record UR1v5 in FIG. 4 and to update record UR1v6 in FIG. 5.

Because page recovery mapping 423 directly refers to or points to backup page 432 and to update record UR1v6 (i.e., page recovery mapping 423 stores values or identifiers via which backup page 432 and update record UR1v6 can be accessed without searching), data store page recovery system 410 can efficiently locate the data or information that is used to recover from a failure of page 1. Moreover, in some implementations and as discussed in this example, data store page recovery system 410 updates page recovery mapping 423 only when a page is written from buffer pool 421 to a storage device. Accordingly, data store page recovery system 410 need not monitor individual changes to pages in buffer pool 421. In this example, hot pages (e.g., pages that are frequently changed within a data store and not evicted from a buffer pool) or duplicate or redundant updates to pages, for example, do not cause data store recovery system 410 to frequently update page recovery mapping 423. Such operation of data store page recovery system 410 can allow data store page recovery system 410 to use fewer resources than recovery mechanisms that monitor all changes to pages of a data store.

Figure 6:
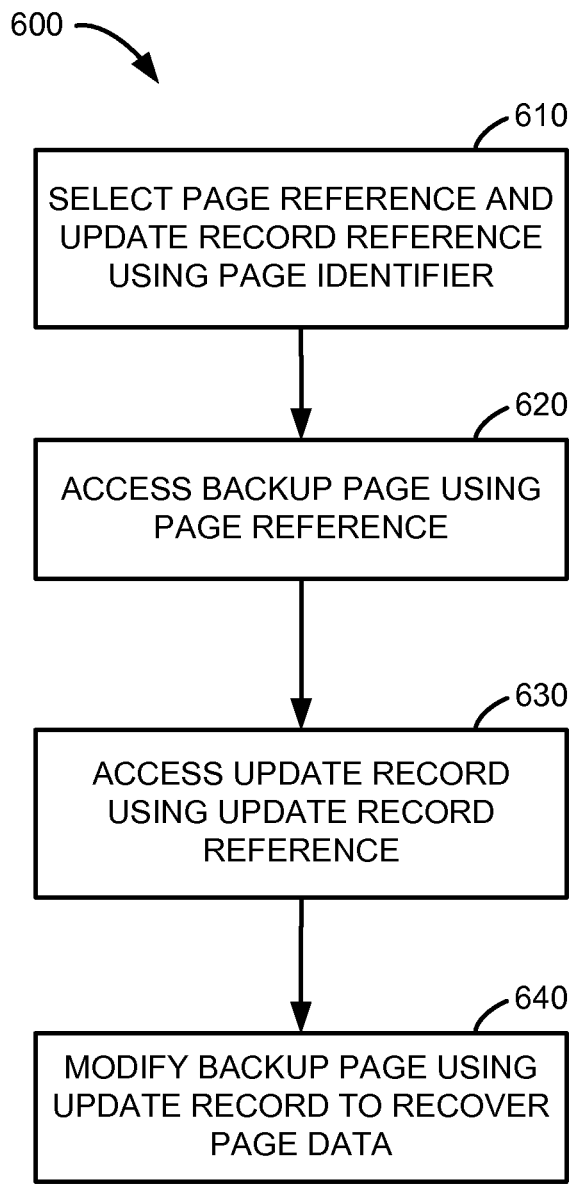
FIG. 6 is a flowchart of a data store page recovery process, according to another implementation.

FIG. 6 is a flowchart of a data store page recovery process, according to another implementation. Process 600 can be executed at a data store page recovery system to, for example, recover a failed page. A page reference associated with a backup page and an update record reference are selected using a page identifier at block 610. For example, a page recovery module of a data store page recovery system can select the page reference associated with a backup page and the update record reference by accessing a portion of a page recovery mapping using a page identifier of a failed page.

The backup page for the failed page is then accessed using the page reference at block 620. As a specific example, a data store page recovery system implementing process 600 requests the backup page at a storage device using the page reference. Accordingly, the data store page recovery system need not search or access a group of backup pages (e.g., pages at a snapshot of a data store), or groups of backup pages, to identify a backup page for the failed page. Rather, the data store page recovery system can directly access the backup page.

Some failed pages can be a later version of a page than the backup page accessed at block 620. For example, the backup page can include a version identifier that identifies the backup pages as a second version of a page, and the failed page can include a version identifier that identifies the failed page as a third version of the page. Accordingly, an update record is accessed using the update record reference at block 630. The update record describes the changes from the second version to the third version of the page. Similar to accessing the backup page, a data store page recovery system implementing process 600 can request the update record at a storage device using the update record reference. Said differently, the data store page recovery system can access the update record by dereferencing the update record reference.

At block 640, a data store page recovery system can determine whether additional update records are related to or associated with a failed page. That is, the data store page recovery system can access version identifiers at the failed page, the backup page, and the update record accessed at block 630 to determine whether additional update records should be accessed to recover the failed page. For example, if the version of the update record is more recent than one version after the version of the backup page (e.g., if the backup page is a first version and the update record is greater than a second version), another update record can be accessed using a reference to a previous update record at the update record accessed at block 630. That is, process 600 returns to block 630 to access the previous update record using that reference.

For example, in some instances of failed pages, the differences between the backup page and the failed page are described by more than one update record. In other words, there may be multiple update records pertaining to the failed page that are more recent than the most recent update record applied to the backup page. Such update records can be associated one with another in a list, a relational database, or some other data structure or mechanism. As a specific example, such update records can be associated one with another in a linked list.

As a specific example, the recovery log can also include an update record that describes the changes from the third version to the fourth version and an update record that describes the changes from the fourth version to the fifth version. The update record accessed at block 630, the update record that describes the changes from the third version to the fourth version, and the update record that describes the changes from the fourth version to the fifth version can define or be included within a linked list. That is, the update record accessed at block 630 can include a reference to the update record that describes the changes from the third version to the fourth version, and the update record that describes the changes from the third version to the fourth version includes a reference to the update record that describes the changes from the fourth version to the fifth version. Thus, each update record in the linked list can be accessed recursively (e.g., the next update record is accessed from the current update record) starting from or based on the update record reference accessed at block 610.

If no more additional update records should be accessed at block 640 (e.g., the version of the update record is not more recent than one version after the version of the backup page), process 600 proceeds to block 650 at which the backup page is modified according to the update record or update records accessed at block 630. That is, the changes described in update records accessed at block are applied to the backup page.

FIG. 6 illustrates a particular example of process 600. Accordingly, in other implementations, process 600 can include additional or fewer blocks, or blocks assembled in a different order than those illustrated in FIG. 6. For example, a failed page can be a version of the page other than the most recent version of the page. Thus, the update record referred to by an update record reference at a page recovery mapping may not be used to recover the failed page. In such circumstances, a data store page recovery system can traverse a linked list of update records beginning with the update record referred to by the update record reference at a page recovery mapping until an update record that includes a version identifier that is equal to a version identifier of the failed page is accessed. The data store page recovery system can access that update record at block 630, and process 600 can proceed as discussed above.

Alternatively, in another implementation, a failed page can be both recovered and updated to the most recent version of the page. For example, if a failed page is a version of the page other than the most recent version of the page, update records of later versions of the page can be applied to a backup page to recover the failed page to a later version (e.g., the most recent version) of the page. Said differently, the update record referred to by the update record reference at a page recovery mapping can be used to modify a backup page and recover from a failed page even if that update record is associated with a more recent version of the page than the failed page.

In some implementations, a data store page recovery system implementing process 600 also applies update record analysis to the set of update records that should be applied to a backup page. For example, update record analysis can be performed at an additional block between blocks 630 and 640. As an example of update record analysis, if one update record indicates that certain data are added to a page and a subsequent update record indicates that that same data is removed, the data store page recovery system can determine that it does not need to add that data to the page. In other words, the addition and removal operations (or the update records or portions thereof that describe or recorded these operations) can be disregarded (or discarded or ignored) and not applied to the backup pages. Other examples of update record analysis include, for example, identifying data that are modified by multiple update records and discarding all but the final modification operations, determining that operations can be combined or rearranged to improve an execution efficiency of those operations, and identifying and discarding redundant operations. Such update record analysis can improve the efficiency of page recovery by the data store page recovery system by enhancing (e.g., optimizing) application of update records to backup pages (or to copies of backup pages).

Figure 7:
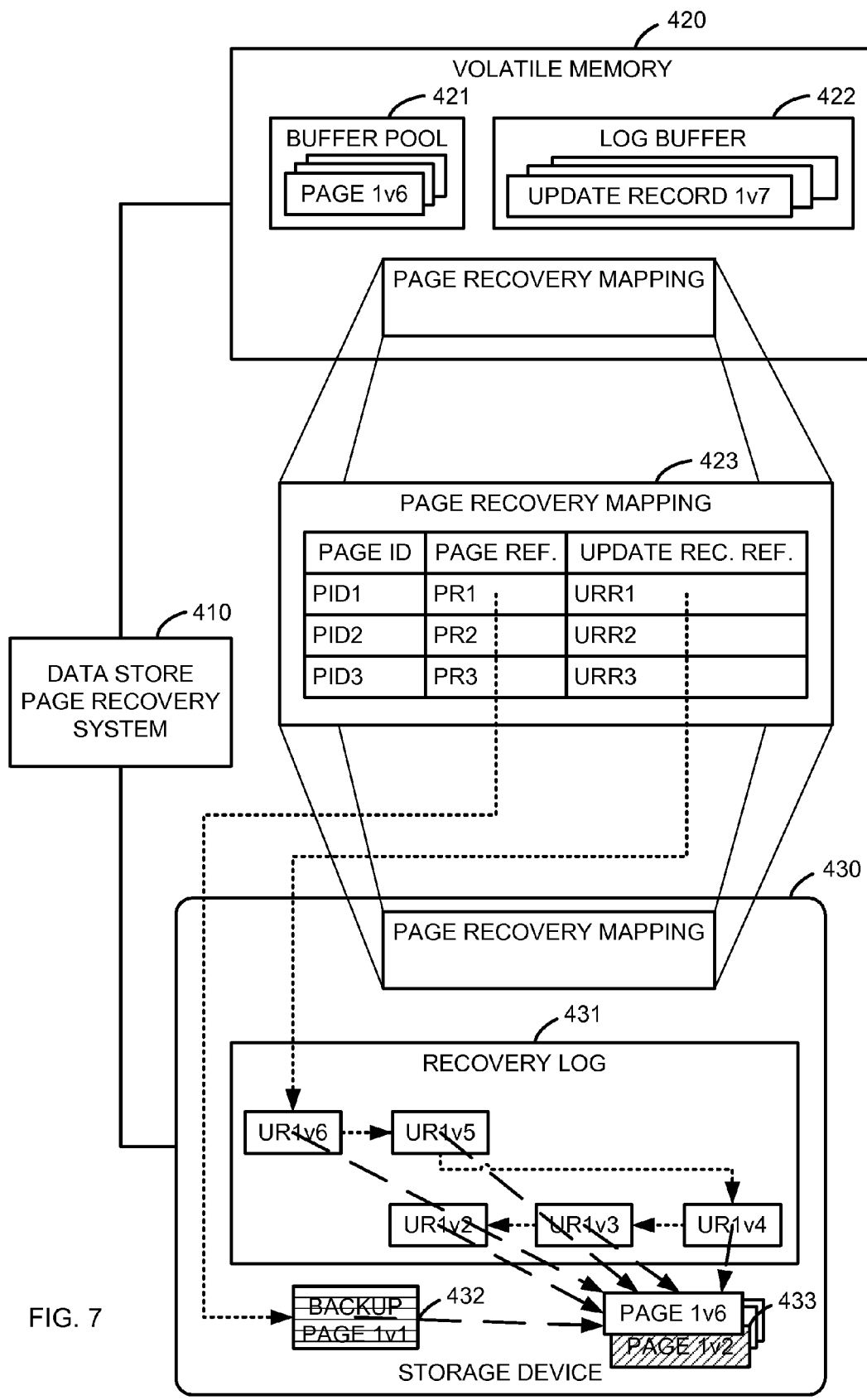
FIGS. 7 and 8 illustrate operation of a data store page recovery system within an environment, according to an implementation.
Figure 8:
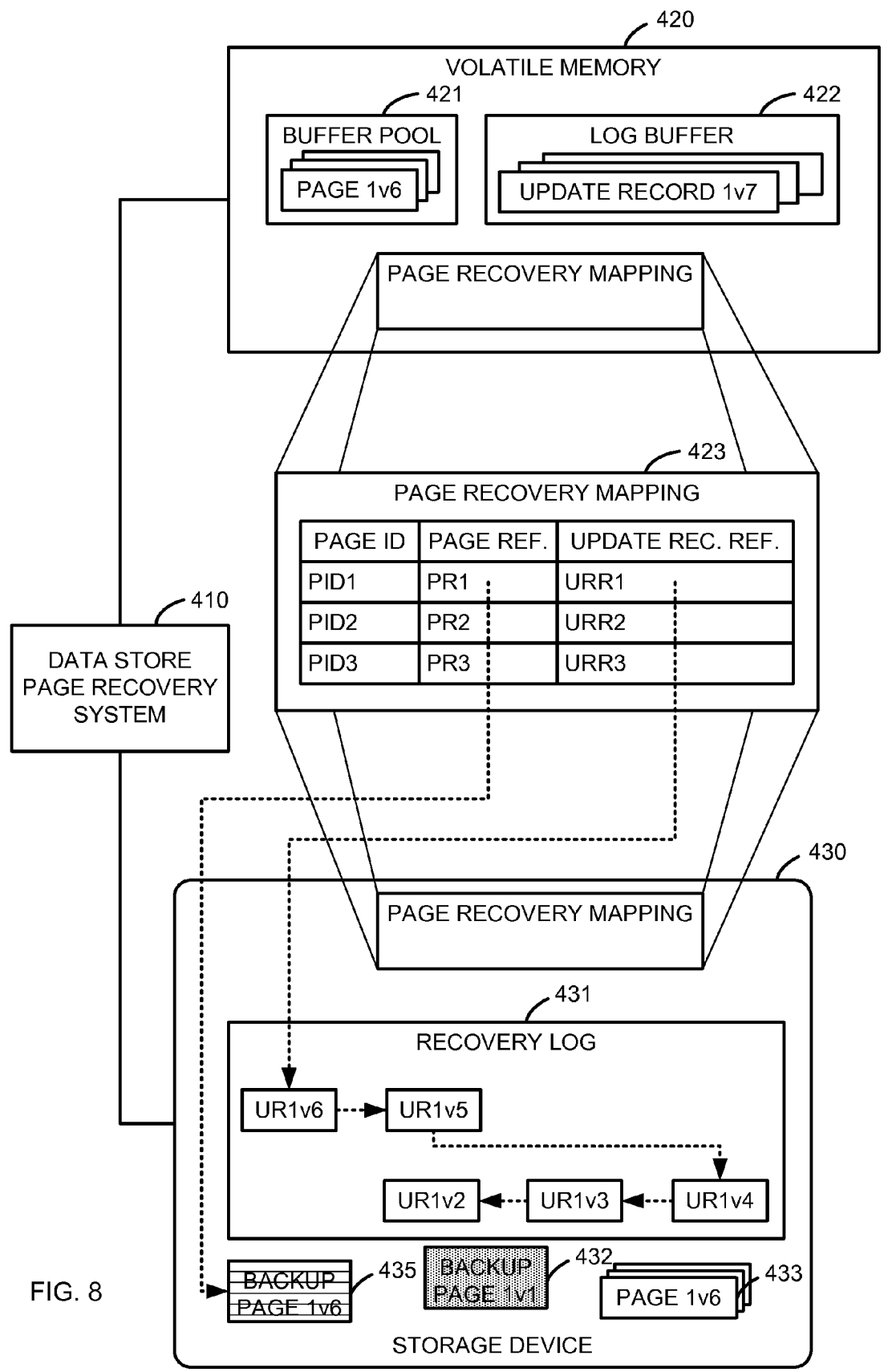

FIGS. 7 and 8 illustrate operation of a data store page recovery system within an environment, according to an implementation. The environment illustrated in FIGS. 7 and 8 is similar to the environment discussed above in relation to FIGS. 4 and 5. In particular, FIGS. 7 and 8 are also examples that illustrate interaction between data store page recovery system 410, page recovery mapping 423, and the data store with respect to page 1.

FIG. 7 illustrates recovery from a failed page. As illustrated in FIG. 7, page 1v2 of pages 433 has experienced a failure and is inaccessible. For example, a portion of storage device 430 at which page 1v2 of pages 433 is stored can be corrupted or have experienced a lost or degraded ability to store data. Data store page recovery system 410 can detect or determine such conditions based on, for example, verifying checksum or signature of data stored at that portion of storage device 430. Alternatively, for example, the data store can detect such a condition and provide a signal or notification to data store recovery system to indicate that page 1v2 of pages 433 should be recovered.

Data store page recovery system 410 accesses backup page 432 via page reference PR1 stored at page recovery mapping 423. For example, data store page recovery system 410 can access page reference PR1 using a page identifier of page 1 (i.e., a page identifier of failed page 1$v$2 of pages 433). Additionally, data store page recovery system 410 accesses update record UR1$v$6 via update record reference URR1.

Data store page recovery system 410 then recursively accesses each update record associated with page 1 that will be used to recover from the failure of page 1$v$2 of pages 433. For example, data store page recovery system 410 can access each update record in the linked list for page 1 until an update record with a version identifier that identifies the version of page 1 that is subsequent to the version of backup page 432. Here, data store page recovery system 410 accesses update records UR1$v$6, UR1$v$5, UR1$v$4, UR1$v$3, and UR1$v$2 because backup page 432 is a copy of the first version of page 1.

As illustrated in FIG. 7, data from backup 432 is copied to a new page at pages 433, and data store page recovery system 410 then modifies backup page 432 according to or based on the update records (e.g., using the descriptions of changes included in the update records). Said differently, data store page recovery system 410 applies the changes described in update records UR1$v$6, UR1$v$5, UR1$v$4, UR1$v$3, and UR1$v$2 to backup page 432 (or to a copy of backup page 432 as illustrated in FIG. 7). In other words, the changes to page 1 described by update records UR1$v$6, UR1$v$5, UR1$v$4, UR1$v$3, and UR1$v$2 are replayed with respect to backup page 432. In some implementations, the update records are applied to backup page 432 in the order in which they occurred. That is, in the reverse order in which they were accessed. In other implementations, the update records are applied or replayed in the order in which they were accessed. In yet other implementations, the update records can be applied in a different order and/or some of the update records can be skipped to enhance or optimize updating or modifying backup page 432.

In some implementations, data store page recovery system 410 adds a copy of each update record (or a reference to each update record) to a list, a stack or another data structure while data store page recovery system 410 traverses a linked list of update records to locate an update record to be applied to a backup page (or copy thereof) first. The copies of the update records or references thereto can then be used to access the description of the changes in each update record in the order in which they occurred (e.g., for FIG. 7 in the order of UR1$v$2, UR1$v$3, UR1$v$4, UR1$v$5, and UR1$v$6 rather than the order of UR1$v$6, UR1$v$5, UR1$v$4, UR1$v$3, and UR1$v$2 accessed while traversing the linked list from update record reference URR1).

Alternatively, for example, the linked list of update records can be a doubly-linked list, and data store page recovery system 410 can recursively traverse the linked list in the opposite direction after locating the update record to apply first, and then apply the update records to backup page 432 while traversing the linked list in the opposite direction. As yet another alternative, update record reference URR1 can refer or point to update record UR1$v$2 (i.e., the update record for the version of page 1 that is subsequent to the version of page 1 stored at backup page 432), and UR1$v$2 can refer to UR1$v$3, UR1$v$4 can refer to UR1$v$4, UR1$v$4 can refer to UR1$v$5, and UR1$v$5 can refer to UR1$v$6. In other words, the update records can be included in a linked list in the order the update records were added to recovery log 431, rather than in the reverse order as illustrated in FIG. 7. If the update records are so ordered in a linked list, the update records can be applied to backup page 432 while data store page recovery system 410 traverses the linked list of update records.

After update records UR1$v$6, UR1$v$5, UR1$v$4, UR1$v$3, and UR1$v$2 have been applied to backup page 432 (or to a copy of backup page 432) backup page 432 has been updated to the sixth version of page 1. That is, backup page 432 has the data included in the sixth version of page 1. As illustrated in FIG. 7, a copy of backup page 432 was updated to the sixth version of page 1 and is added to page 433 to replace failed page 1$v$2 of pages 433.

In other implementations, a failed page is recovered by updating the backup page (or copy thereof) for the failed page to the version of the failed page. For example, backup page 432 is updated to the version of failed page 1$v$2 of pages 433. That is, backup page 432 (or a copy of backup page 432 at pages 433) is updated from the first version of page 1 to the second version of page 1. In this example, the copy of backup page 432 would be updated from the first version of page 1 to the second version of page 1. More specifically, update record UR1$v$2 can be applied to the copy of backup page 432, and update records UR1$v$6, UR1$v$5, UR1$v$4, and UR1$v$3 can be omitted.

FIG. 8 illustrated defining a new backup page. As illustrated in FIG. 8, pages 433 includes page 1$v$6 (i.e., version 6 of page 1) and backup page 432 is version 1 of page 1. Page 1$v$6 of pages 433 can have been updated from, for example, page 1$v$2 illustrated in FIGS. 4 and 5 in response to an in-place update of the data store or a recovery process as described above in relation to FIG. 7.

Data store page recovery system 410 can determine that a new backup page is desirable under a variety of circumstances. For example, a portion of a memory at which backup page 432 is stored can become corrupted or cease to properly store data, or data store page recovery system 410 can determine that a new backup page can enhance the efficiency of a potential or future page recovery.

After determining that a new backup page is desirable, data store page recovery system 410 can verify the data or data integrity of page 1$v$6 of pages 433 using a checksum or signature of page 1$v$6 of pages 433. If data store page recovery system 410 successfully verifies the data of page 1$v$6 of pages 433 (e.g., a checksum generated from the data of page 1$v$6 of pages 433 matches or satisfies a predetermined checksum for the data of page 1$v$6 of pages 433), data store page recovery system 410 generates a copy of page 1$v$6 of pages 433. This copy is backup page 435 (labeled "BACKUP PAGE 1V6") is FIG. 8. Alternatively, if data store page recovery system 410 cannot verify the data of page 1$v$6 of pages 433 (e.g., a checksum generated from the data of page 1$v$6 of pages 433 does not match or satisfy a predetermined checksum for the data of page 1$v$6 of pages 433), data store page recovery system 410 can recover page 1$v$6 of pages 433 as described, for example, above in relation to FIGS. 6 and 7 and then generate a copy of the recovered page 1$v$6 of pages 433.

Data store page recovery system 410 then accesses the page reference related to page 1 at page recovery mapping 423 (e.g., using a page identifier of page 1), and modifies that page reference to refer to backup page 435. Thus, the portion of page recovery mapping 423 that is associated with or related to page 1 refers to backup page 435 rather than backup page 432.

Additionally, backup page 435 can be marked to prevent deletion of backup page 435. Furthermore, because backup page 432 no longer serves as a backup for page 1, backup page 432 can be unmarked to allow deletion of backup page 432. For example, a delete bit in a bit field of backup page 432 can be cleared to allow deletion or garbage collection of backup page 432.

In some implementations, a new backup page can be selected from a recent snapshot of a data store rather than from an active page of the data store. For example, a data store or other module can notify data store page recovery system 410 that a snapshot has been generated, and data store page recovery system 410 can define (or identify) a page of the snapshot as a backup and update a page reference of page recovery mapping 423 to refer to that page. Thus, the page of the snapshot becomes backup page 435.

Although not illustrated in FIG. 8, a data store page recovery system 410 can remove update records from recovery log 431 that are older than backup page 435. For example, data store page recovery system 410 can delete update records $UR1v6$, $UR1v5$, $UR1v4$, $UR1v3$, and $UR1v2$ because these update records are not needed to modify backup page 435 to be the same version of page 1 as page $1v6$ of pages 433 (i.e., the active page in storage device 430 for page 1).

Figure 9:
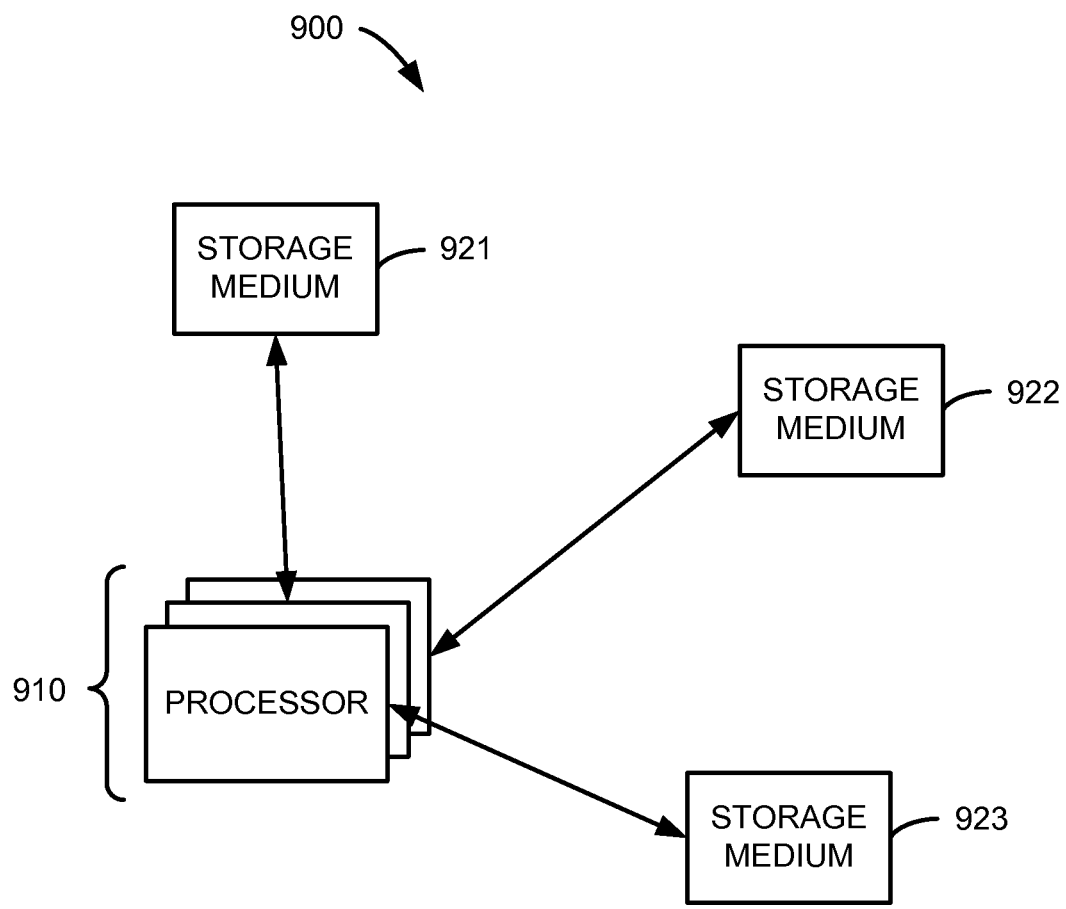
FIG. 9 is a schematic block diagram of a system including one or more processors and storage media, according to an implementation.

In some implementations, data store page recovery system can be implemented at a system such as a computing device including one or more processors and various storage media. FIG. 9 is a schematic block diagram of a system including one or more processors and storage media (or memories), according to an implementation. As illustrated in FIG. 9, system 900 includes one or more processors 910 operatively coupled to storage medium 921, storage medium 922, and storage medium 923.

One or more processors 910 can access instructions or code at storage medium 921, storage medium 922, and storage medium 923. Storage media 921, 922, and 923 can be any processor-readable media and/or related devices to access processor-readable media. For example, storage medium 921 can be a hard disk drive including a magnetic storage medium, a solid-state storage medium, or a memristor storage medium; storage medium 922 can be an optical drive such as a DVD drive and can accept DVD storage media on which processor-readable instructions such as processor-readable instructions that implement a report generation tool can be stored; and storage medium 923 can be a FLASH memory drive with a Universal Serial Bus ("USB") interface. In some implementations, storage media 921, 922, and/or 923 can be local to (e.g., coupled to a common computing device) one or more processors 910. In some implementations, storage media 921, 922, and/or 923 can be remote from (e.g., coupled to a separate computing device) one or more processors 910 and in communication with one or more processors 910 via communications link. Furthermore, one or more of storage media 921, 922, and/or 923 can be local to one or more processors 910 and one or more of the remaining of storage media 921, 922, and/or 923 can be remote from one or more processors 910.

As a more specific example, one or more processors 910 can be included within a computing device such as a computing device hosting a data store page recovery system having an internal hard disk drive data store represented by storage medium 921 and a removable solid-state data store such as a Secure Digital High-Capacity ("SDHC") memory card represented by storage medium 922. The computing device can also include a USB host controller to communicate with a USB FLASH memory drive represented by storage medium 923. One or more processors 910 can access processor-executable instructions such as processor-executable instructions that implement an operating system, a software application such a data store page recovery system, and/or other software applications at any of storage media 921, 922, and/or 923. Said differently, one or more processors 910 can interpret or execute instructions at processor-readable media (e.g., at storage medium 921, storage medium 922, and/or storage medium 923). For example, a computing device can execute a data store page recovery system stored at a remote storage medium.

Alternatively, for example, storage media 921 and 922 can be remote from a computing device including one or more processors 910 and storage medium 923 can be local to that computing device. The computing device including one or more processors 910 can download a data store page recovery system from one or both of remote storage media 921 or 922 via a communications link such as a communications network to local storage medium 923, and execute the data store page recovery system from local storage medium 923. As another example, storage medium 921 can be a DVD including an installation package for a data store page recovery system and storage medium 922 can be a hard disk drive of a computing device. The installation package can be executed or interpreted at processors 910 to install the data store page recovery system at storage medium 922. The computing device can then host or execute the data store page recovery system at storage medium 922.

In some implementations, system 900 can include one or more memories such as RAM that function as a cache between one or more of storage medium 921, storage medium 922, and/or storage medium 923 and one or more processors 910 for instructions or code stored (or accessible) at one or more of storage medium 921, storage medium 922, and/or storage medium 923.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. As a specific example, implementations discussed above with reference to specific types and/or arrangements of processor-readable media (e.g., memories, storage media, storage devices, etc.) can be applicable to different, more, or fewer types and/or arrangements of processor-readable media. As another example, functionalities discussed above in relation to specific modules, engines, or elements can be included at different modules, engines, or elements in other implementations. Furthermore, it should be understood that the systems and methods described herein can include various combinations and/or sub-combinations of the components and/or features of the different implementations described. Thus, features described with reference to one or more implementations can be combined with other implementations described herein.

What is claimed is:

1. A non-transitory machine-readable storage medium storing code representing instructions to cause a processor to perform a data store page recovery process, the process comprising:

selecting a page reference and an update record reference at a page recovery mapping based on a page identifier, the page reference associated with the update record reference at the page recovery mapping;

accessing a backup page via the page reference, wherein the backup page is a first backup page and the page reference is a first page reference;

accessing an update record via the update record reference;

modifying the backup page according to the update record;

marking the backup page to prevent deletion of the backup page;

selecting a second backup page;

after selecting the second backup page, marking the first backup page to allow deletion of the first backup page; and replacing the first page reference with a second page reference at the page recovery mapping, the second page reference associated with the second backup page.

2. The non-transitory machine-readable storage medium of claim 1, wherein the page reference and the update record reference are associated at the page recovery mapping with a failed page of a data store, the process further comprising:
replacing the failed page of the data store with the backup page after the modifying, the data store being online during the selecting, the accessing the backup page, the accessing the update record, the modifying, and the replacing.

3. The non-transitory machine-readable storage medium of claim 1, the process further comprising:
recursively accessing a plurality of update records from the update record; and
modifying the backup page according to the plurality of update records.

4. The non-transitory machine-readable storage medium of claim 1, the process further comprising:
accessing a plurality of update records from the update record;
applying update record analysis to the plurality of update records; and
modifying the backup page based on the plurality of update records and the update record analysis.

5. The non-transitory machine-readable storage medium of claim 1, the process further comprising:
accessing a first plurality of update records from the update record;
disregarding a second plurality of update records from the first plurality of update records to define a third plurality of update records; an
modifying the backup page according to the third plurality of update records.

6. A data store page recovery system, comprising:
a record module to store an update record associated with a page of a data store, the update record describing an update to the page; and
a page recovery module to
store a reference to the update record at a portion of a page recovery mapping associated with the page, the portion of the page recovery mapping including a reference to a backup page associated with the page,
replace the reference to the update record with a second reference to a second update record associated with the page at the page recovery mapping; and
storing the reference to the update record at the second update record.

7. The system of claim 6, wherein:
the reference to the backup page is a first backup page;
the page recovery module is configured to replace the reference to the first backup page with a reference to a second backup page in response to the page being written to a storage medium; and
the second backup page is the page at the storage medium.

8. The system of claim 6, further comprising:
a first memory to include a page buffer pool and the page recovery mapping, the page stored at the page buffer pool; and
a second memory to include the backup page, the page recovery module configured to store the reference to the update record at the portion of the page recovery mapping associated with the page in response to eviction of the page from the page buffer pool.

9. The system of claim 6, further comprising:
a first memory to include a page buffer pool, the page stored at the page buffer pool; and
a second memory to include the backup page and the page recovery mapping, the page recovery module configured to store the reference to the update record at the portion of the page recovery mapping associated with the page in response to eviction of the page from the page buffer pool.

10. The system of claim 6, wherein the backup page is a first backup page, the system further comprising:
a backup page selection module to select the first backup page at a first time, to select a second backup page associated with the page at a second time, and to discard the first backup page after the second time, the page recovery module configured to replace the reference to the first backup page at the portion of the page recovery mapping with a reference to the second backup page.

11. The system of claim 6, wherein the backup page is a first backup page, the system further comprising:
a backup page selection module to select the first backup page at a first time, to mark the first backup page to prevent deletion of the first backup page after the first time, to select a second backup page associated with the page at a second time, and to mark the first backup page to allow deletion of the first backup page after the second time, the page recovery module configured to replace the reference to the first backup page at the portion of the page recovery mapping with a reference to the second backup page.

12. A non-transitory machine-readable storage medium storing code representing instructions to cause a processor to perform a data store page recovery process, the process comprising:
defining a backup page based on a valid page;
storing a reference to the backup page at a page recovery mapping;
storing a reference to an update record associated with the valid page at the page recovery mapping, the reference to the backup page associated with the reference to the update page at the page recovery mapping, the update record comprising a first update record associated with the valid page; and
replacing the reference to the first update record with a reference to a second update record associated with the valid page at the page recovery mapping; and
storing a reference to the first update record at the second update record.

13. The non-transitory machine-readable storage medium of claim 12, the process further comprising:
accessing a plurality of update records from the update record;
applying update record analysis to the plurality of update records; and
modifying the backup page based on the plurality of update records and the update record analysis.

14. The non-transitory machine-readable storage medium of claim 12, the process further comprising:
accessing a first plurality of update records from the update record;
disregarding a second plurality of update records from the first plurality of update records to define a third plurality of update records; and
modifying the backup page according to the third plurality of update records.

15. The non-transitory machine-readable storage medium of claim 12, the process further comprising:

selecting the reference to the backup page and the reference to the update record at the page recovery mapping based on an identifier of the valid page;

accessing the backup page via the reference to the backup page;

accessing the update record via the reference to the update record; and modifying the backup page according to the update record.

16. The non-transitory machine-readable storage medium of claim 12, the process further comprising:

selecting the reference to the backup page and the reference to the update record at the page recovery mapping based on a page identifier associated with the valid page;

accessing the backup page via the reference to the backup page;

accessing a plurality of update records via the reference to the update record, the plurality of update records including the update record; and modifying the backup page according to the plurality of update records.

* * * * *